United States Patent
Newland

(10) Patent No.: US 6,169,707 B1
(45) Date of Patent: Jan. 2, 2001

(54) MEDICATION STORAGE AND REMINDER DEVICE

(76) Inventor: Douglas A. Newland, 2780 Cleveland Ave., Suite 805, Ft. Myers, FL (US) 33901-5857

(*) Notice: Under 35 U.S.C. 154(b), the term of this patent shall be extended for 0 days.

(21) Appl. No.: 09/201,394

(22) Filed: Nov. 30, 1998

(51) Int. Cl.[7] .................................................. G04B 47/00
(52) U.S. Cl. .................................................. 368/10; 221/2
(58) Field of Search ............................. 368/10; 206/534, 206/538, 593; 221/2, 3, 15; 340/568, 309.115, 309.4

(56) References Cited

U.S. PATENT DOCUMENTS

| | | |
|---|---|---|
| 3,762,601 | 10/1973 | McLaughlin . |
| 3,917,045 | 11/1975 | Williams et al. . |
| 4,293,845 * | 10/1981 | Villa-Real .............................. 368/10 |
| 4,473,156 * | 9/1984 | Martin .................................. 206/534 |
| 4,483,626 | 11/1984 | Noble . |
| 4,490,711 * | 12/1984 | Johnston .............................. 368/10 |
| 4,504,153 | 3/1985 | Schollmeyer et al. . |
| 4,526,474 | 7/1985 | Simon . |
| 4,725,997 | 2/1988 | Urquhart et al. . |
| 4,725,999 * | 2/1988 | Tate ....................................... 368/10 |
| 4,768,177 * | 8/1988 | Kehr et al. ............................ 368/10 |
| 4,835,520 * | 5/1989 | Aiello ................................... 368/10 |
| 5,099,463 * | 3/1992 | Lloyd et al. ........................... 368/10 |
| 5,152,422 | 10/1992 | Springer . |
| 5,159,581 | 10/1992 | Agans . |
| 5,176,285 | 1/1993 | Shaw . |
| 5,347,453 | 9/1994 | Maestre . |
| 5,408,443 * | 4/1995 | Weinberger ........................... 368/10 |
| 5,412,372 * | 5/1995 | Parkhurst et al. ..................... 368/10 |
| 5,431,299 | 7/1995 | Brewer et al. . |
| 5,472,113 | 12/1995 | Shaw . |
| 5,495,961 | 3/1996 | Maestre . |
| 5,564,593 | 10/1996 | East, Sr. . |
| 5,582,323 | 12/1996 | Kurtenbach . |
| 5,602,802 | 2/1997 | Leigh-Spencer et al. . |
| 5,609,268 | 3/1997 | Shaw . |
| 5,646,912 | 7/1997 | Cousin . |
| 5,752,620 | 5/1998 | Pearson . |
| 5,752,621 | 5/1998 | Passamante . |

* cited by examiner

Primary Examiner—Bernard Roskoski
Assistant Examiner—Jeanne-Marguerite Goodwin
(74) Attorney, Agent, or Firm—Charles J. Prescott

(57) ABSTRACT

A medication storage and reminder device including a generally flat housing defining a uniform upwardly facing array of medication holding cubicles each of which open upwardly for receiving, holding and removal of a dose of medication. The cubicles are arranged in rows and are sufficient in number for receiving individual periodic daily medication doses over a preselected number of days. An individually openable lid is positioned over each cubicle opening and has a separate lock for releasably retaining each lid in a closed position to retain each medication dose within each corresponding cubicle. Each lid bears viewable indicia advising of the proper sequence and timing of manually or automatically opening each lid one at a time to provide access to the corresponding dose of medication. A programmable microprocessor mounted in the housing includes a key control panel for inputting and storing input data of correct time, day, the preselected number of days, and daily medication times, for activating a viewable or audible signal connected to the housing at each said medication time of each day for the selected number of days and for controlling the automatic sequential unlocking of cubicle lids to prevent inadvertent medication errors. A transparent protective lockable cover encloses substantially all of a top of the housing including said array of cubicles and the key control panel, the cover having a lower surface adapted to insure full closing of all lids and, thereby, the securement of all locking means when the cover is properly locked in a closed position atop the housing.

7 Claims, 6 Drawing Sheets

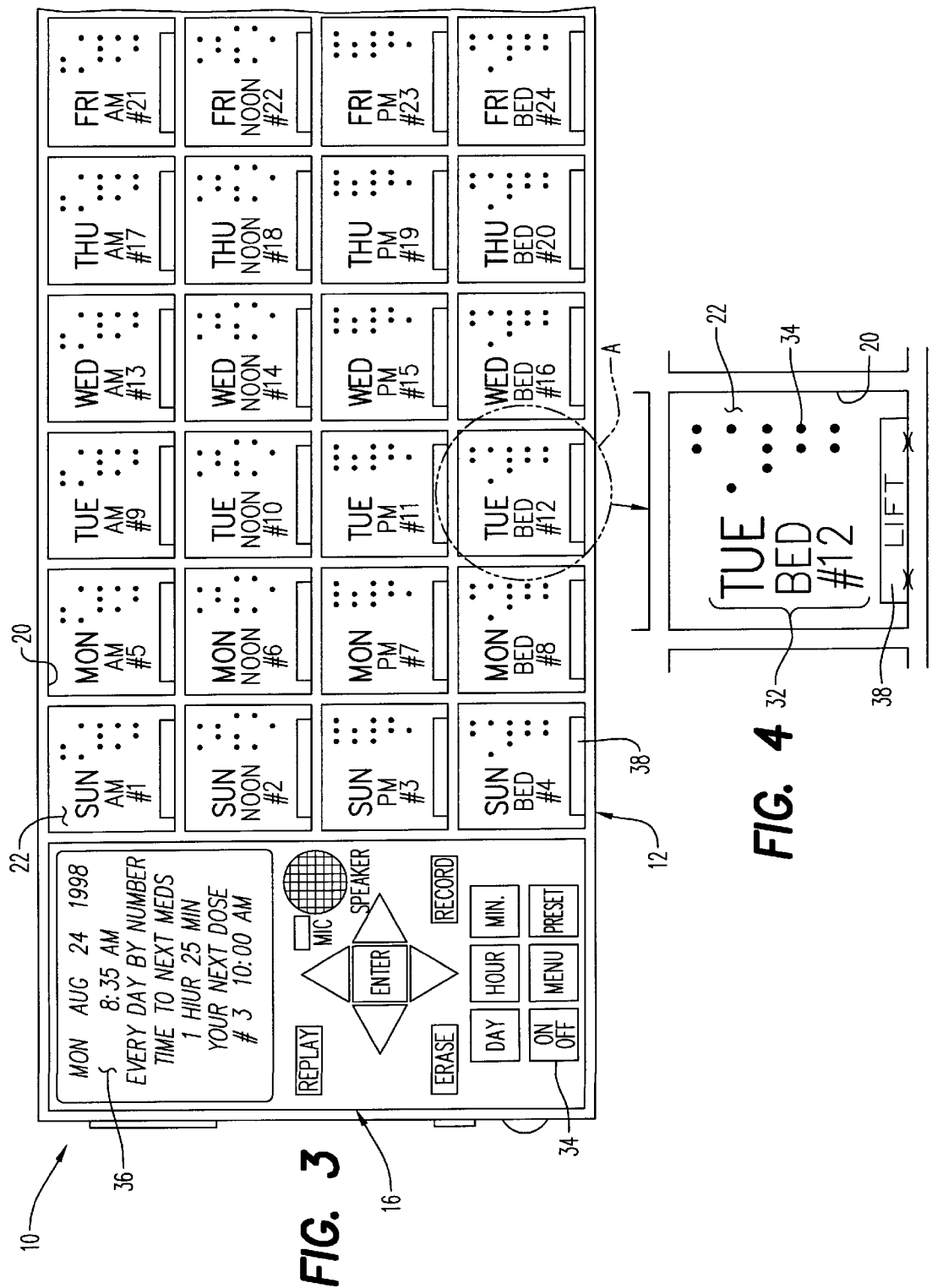

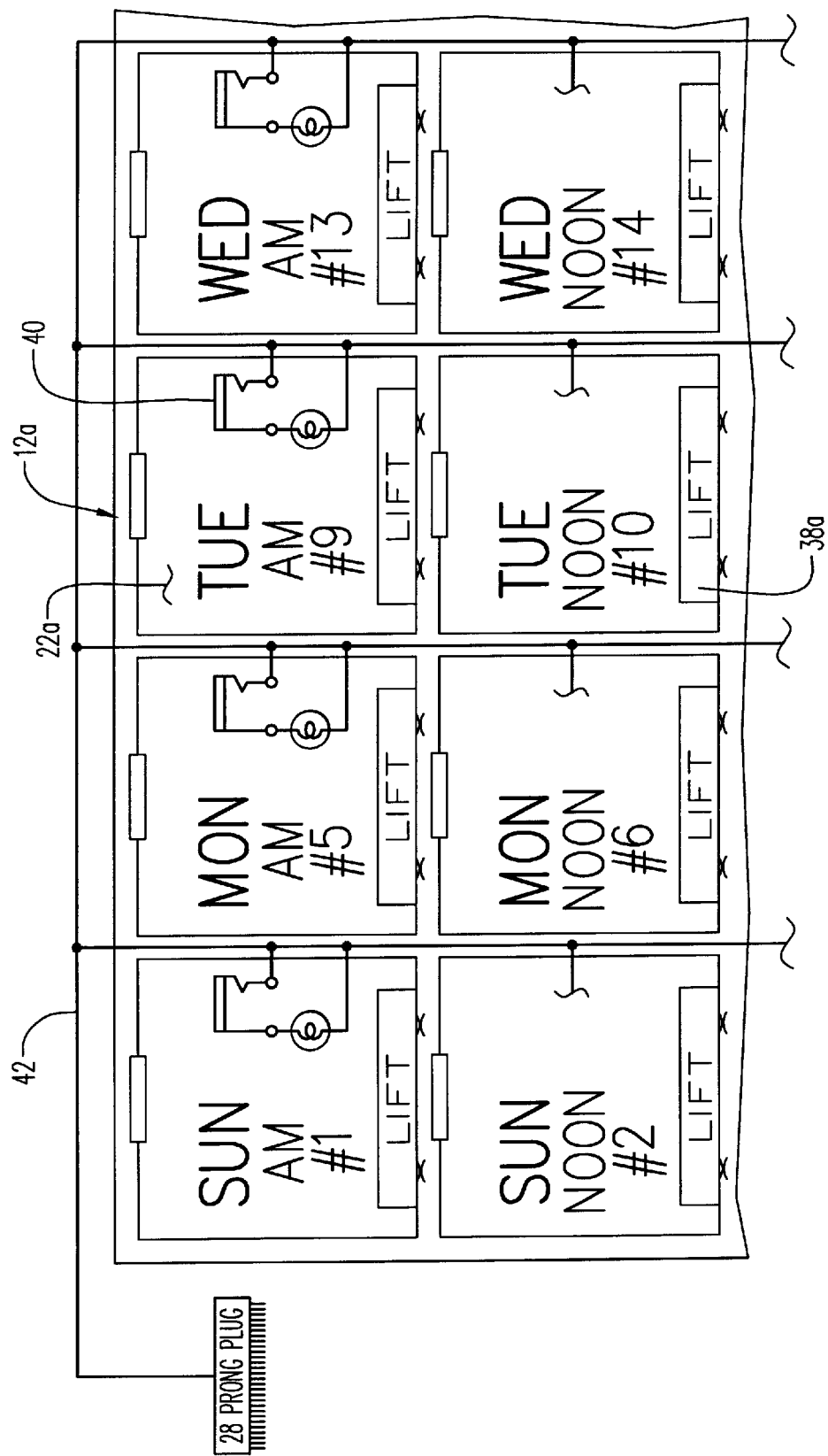

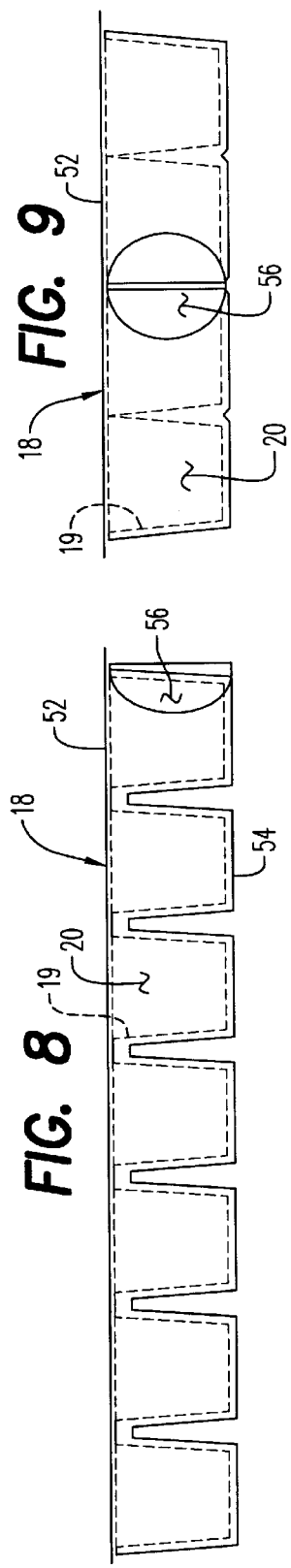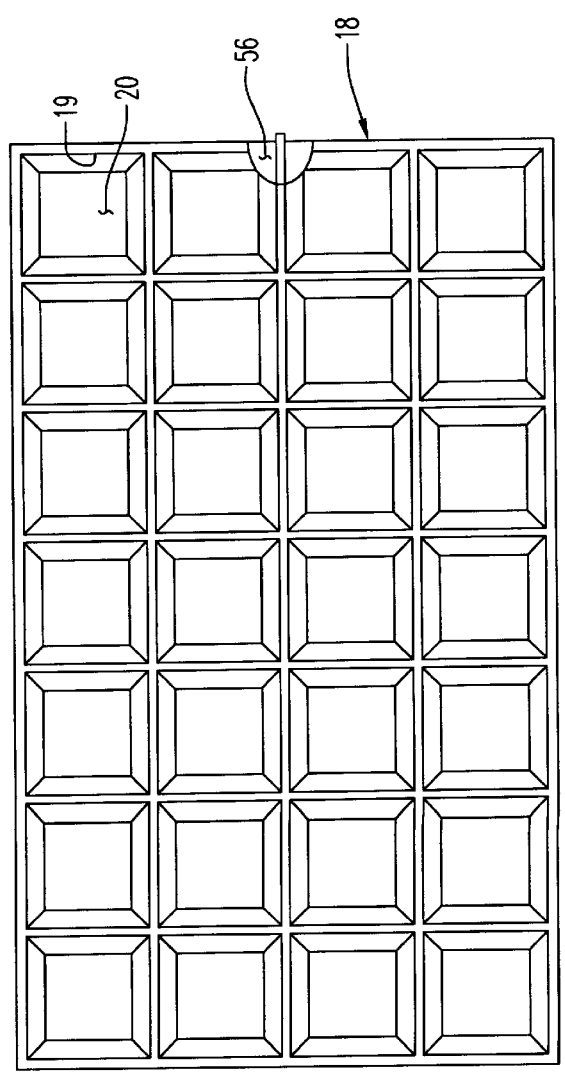

MEDICATION STORAGE AND REMINDER DEVICE

BACKGROUND OF THE INVENTION

1. Scope of Invention

This invention relates generally to medication dispensing and time-for-medication signaling apparatus, and more particularly to a medication storage and reminder device for storing individual timed doses of medication and for providing indicia regarding the sequential timing of the taking of such medication on a daily basis over a prescribed period of time such as a week.

2. Prior Art

Patients frequently forget to take daily timed medication on time, if at all, or alternately misuse or overdose in the taking of medication. Medication compliance also typically drops off to less than fifty percent compliance when three or more different doses of medication are required on a daily basis. There are many medical conditions which critically rely upon the careful administration of drugs such as in the areas of anti-coagulation, seizures, diabetes, narcotics, antibiotics and cardiac medications.

Prior art discloses a great number of medication dispensers and alerting arrangements which advise of the periodic medication taking times, many of which are associated with a programmable computer microprocessor which controls such apparatus. However, there seems to be a general lack of ability to regulate and document patients drug use in a controllable fashion without the need for direct supervision of medication use which is very costly.

Applicant is aware of the following U.S. patents which embody a broad range of features associated with the dispensing and proper timely taking of prescription medications as follows:

U.S. Pat. No. 3,762,601 issued to McLaughlin
U.S. Pat. No. 3,917,045 issued to Williams et al
U.S. Pat. No. 4,483,626 issued to Noble
U.S. Pat. No. 4,504,153 issued to Schollmeyer et al
U.S. Pat. No. 4,526,474 issued to Simon
U.S. Pat. No. 4,725,997 issued to Urquhart et al
U.S. Pat. No. 5,152,422 issued to Springer
U.S. Pat. No. 5,159,581 issued to Agans
U.S. Pat. No. 5,176,285 issued to Shaw
U.S. Pat. No. 5,347,453 issued to Maestre
U.S. Pat. No. 5,431,299 issued to Brewer et al
U.S. Pat. No. 5,472,113 issued to Shaw
U.S. Pat. No. 5,495,961 issued to Maestre
U.S. Pat. No. 5,564,593 issued to East
U.S. Pat. No. 5,582,323 issued to Kurtenbach
U.S. Pat. No. 5,602,802 issued to Leigh-Spencer et al
U.S. Pat. No. 5,609,268 issued to Shaw
U.S. Pat. No. 5,646,912 issued to Cousin
U.S. Pat. No. 5,752,620 issued to Pearson
U.S. Pat. No. 5,752,621 issued to Passamante The present invention distinguishes over this body of prior art teaching by providing a simple and almost foolproof device for set up and dispensing of prescription medications. Daily timing of medications may be programmed into the present invention over a period of days such as a week. Adjustable audible tone or light reminders are provided to announce the proper timing of taking the next-in-order medication. Visible confirmation of the correct medication to take is also provided along with confirmation that each dose has been taken may be input into the data storage of a programmable microcomputer. The preferred embodiment of the invention includes a pharmacy-prefilled tray which is sealed by a removable film prior to being installed into the housing of the invention so that the user need not be concerned with the preparation of accurate doses of medication into the corresponding cubicles in which they are held until it is time for consumption.

BRIEF SUMMARY OF THE INVENTION

This invention is directed to a medication storage and reminder device including a generally flat housing defining a uniform upwardly facing array of medication holding cubicles each of which open upwardly for receiving, holding and removal of a dose of medication. The cubicles are arranged in rows and are sufficient in number for receiving individual periodic daily medication doses over a preselected number of days. An individually openable lid is positioned over each cubicle opening and has a separate lock for releasably retaining each lid in a closed position to retain each medication dose within each corresponding cubicle. Each lid bears viewable indicia advising of the proper sequence and timing of manually or automatically opening each lid one at a time to provide access to the corresponding dose of medication. A programmable microprocessor mounted in the housing includes a key control panel for inputting and storing input data of correct time, day, the preselected number of days, and daily medication times, for activating a viewable or audible signal connected to the housing at each said medication time of each day for the selected number of days and for controlling the automatic sequential unlocking of cubicle lids to prevent inadvertent medication errors. A transparent protective lockable cover encloses substantially all of a top of the housing including said array of cubicles and the key control panel, the cover having a lower surface adapted to insure full closing of all lids and, thereby, the securement of all locking means when the cover is properly locked in a closed position atop the housing.

It is therefore an object of this invention to provide a prescription medication storage and reminder device for individual or hospital use which is relatively fool-proof in advising of the taking of daily timed medications over a period of several days.

It is another object of this invention to provide a prescription medication storage and reminder device which is portable and easy to use by individual patients.

It is yet object of this invention to provide a prescription medication storage and reminder device which is easily programmable for the appropriate daily timed taking of medication from individual lid covered cubicles provided by the device to avoid confusion in proper medication compliance.

It is still another object of this invention to provide a portable prescription medication storage and reminder device for individuals which both reminds the patient either audibly or viewably of the next-in-line medication to be taken, provides visual confirmation that the medication has been timely taken and also provides storage of medication compliance data on a microprocessor of the device.

Still another object of this invention is to provide a portable prescription medication storage and reminder device which receives prefilled trays of medication within individual cubicles which align and register with individual openable lids so that the proper medication is placed by a pharmacist or other medication practitioner into the correct cubicle array.

In accordance with these and other objects which will become apparent hereinafter, the instant invention will now be described with reference to the accompanying drawings.

BRIEF DESCRIPTION OF THE DRAWINGS

FIG. 3 is a top plan broken view of FIG. 1 absent its transparent cover.

FIG. 4 is an enlargement of area A of FIG. 3.

FIG. 5 is an enlarged partial top plan view of the preferred embodiment of the invention.

FIGS. 8, 9 and 10 are side elevation, end elevation and top plan views of the preferred egg crate type refillable or disposable medication tray intended to be filled by a pharmacist and then sealed closed with a removable transparent cover sheet ready for insertion into the housing of the device.

DETAILED DESCRIPTION OF THE INVENTION

Figure 1:
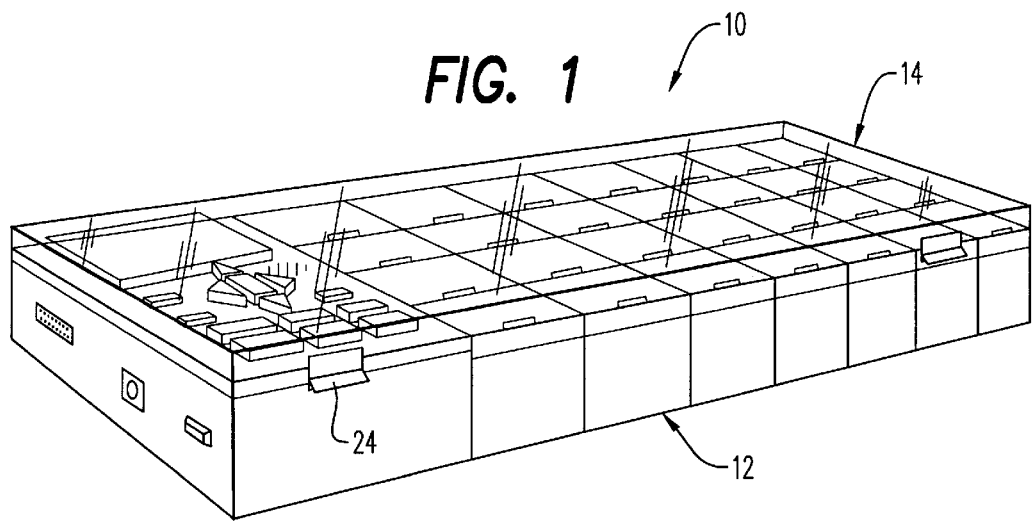
FIG. 1 is a perspective view of the invention with its transparent cover in a closed position.
Figure 2:
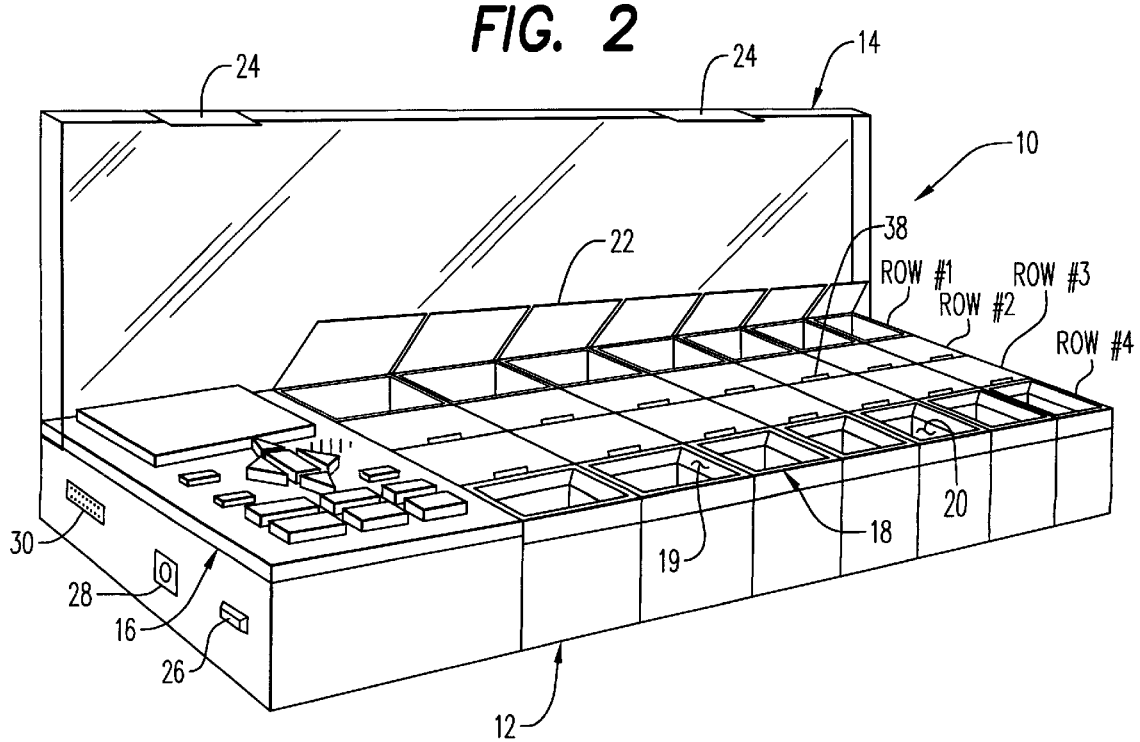
FIG. 2 is a perspective view of FIG. 1 with the transparent cover and some of the lids in an opened position and some removed for clarity.

Referring now to the drawings and firstly to FIGS. 1 to 4, the preferred embodiment of the invention is generally shown at numeral 10 and includes a molded plastic housing 12, a transparent plastic cover 14, and a refillable or disposable medication tray 18 The transparent lid 14 includes releasable locks 24 which hold the cover 14 in a dosed position shown in FIG. 1.

The housing 12 includes an array of upwardly opening lids 22 arranged in uniform rows #1 to #4 as shown. Each pivotally connected lid 22 includes a manually releasable latch 38 along the distal edge thereof as seen in FIGS. 4, 6 and 7.

This embodiment 10 incorporates a reusable or disposable "egg crate" shaped medication tray shown generally at numeral 18 and best seen in FIGS. 8 to 10. This medication tray 18 is provided so that a physician or pharmacist or other appropriate medical practitioner may fill each of cubicles 20 with the appropriate array of daily and day to day medication doses. Thereafter, a thin plastic removable sheet 52 is attached over the upper surface of the medication tray 54 to seal all of the medication contents in the individual cubicles 20. Upon usage, the patient or the medical practitioner will remove the sealed transparent cover sheet 52 and then slidably insert the entire tray into the housing 12 through one open end thereof to rest atop a bottom panel 44 of the housing 12. A finger cavity 56 is provided for this function and for the removal of the medication tray 18 after the medication doses have been completely consumed.

Figure 6:
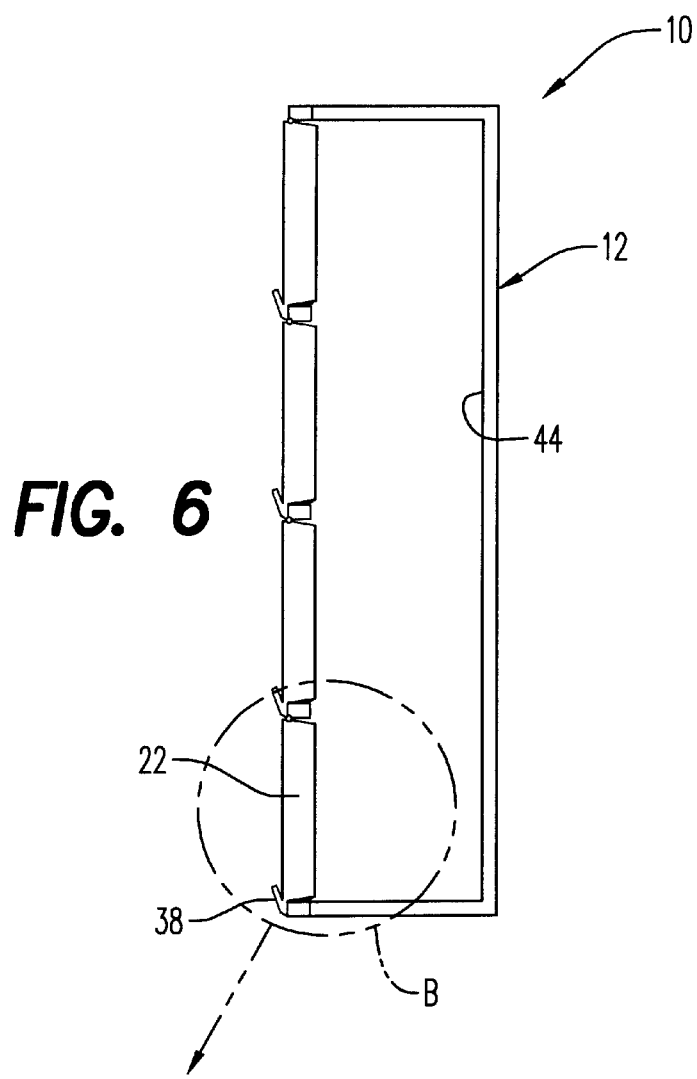
FIG. 6 is an end view of FIG. 3 absent the medical tray for clarity.
Figure 7:
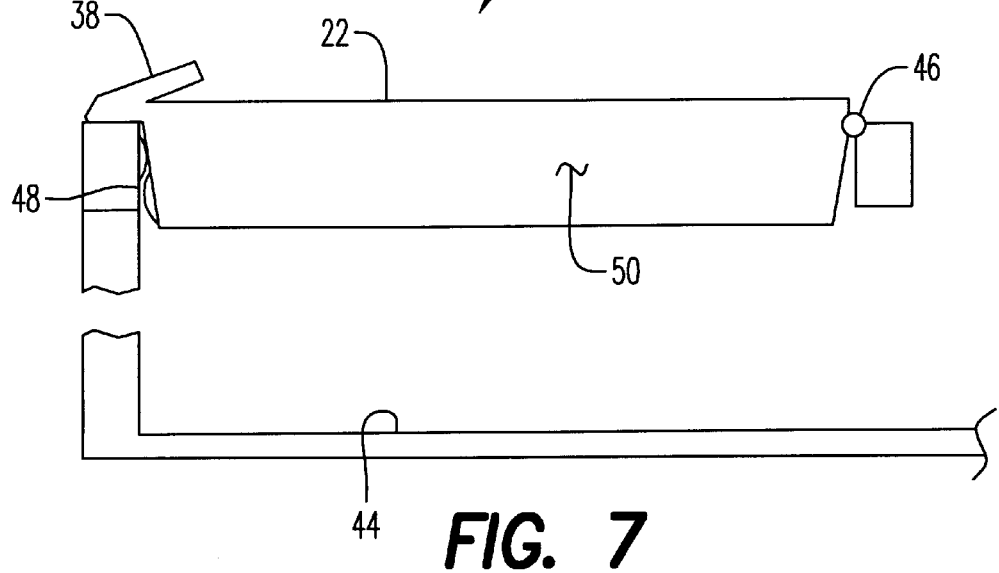
FIG. 7 is an enlargement of area B of FIG. 6.

To insure proper alignment of the medication tray 18 within housing 12, each of the lids 22 as best seen in FIGS. 5 and 6 have tapered thickened structure 50 which mateably engages into the upper tapered portion 19 of each of the cubicles 20. Thus, when all of the lids 22 are closed and locked into position about each pivotal hinge 46, proper alignment of the tray 18 with each of the corresponding lids 22 is achieved.

In this embodiment 10, each of the lids 22 includes viewable indicia of the day of the week, the time period for taking each medication dose contained in each of the corresponding cubicles 20, the approximate time of dosage administration 32 in FIG. 4, e.g. "a.m.", "noon", "p.m.", and "bed", along with a Braille representation 34 so that the invention 10 may be used for dispensing medication for the blind.

This embodiment 10 also includes a microprocessor 16 having a volume control 26, a power adapter input jack 28, and a computer interface jack 30 which facilitates interconnection of the microprocessor 16 with a main computer or to receive data of medication compliance as described below. The microprocessor 16 as best seen in FIG. 3, includes a multi-function Kg control panel having various finger touch control buttons shown typically at 34, along with a viewing screen 36 which displays the programmed information for correctness and completeness. A more complete description of the general and specific functioning of the microprocessor 16 is set forth hereinafter.

In this embodiment 10, medication administration compliance by the patient using the device 10 is generally voluntary. That is to say, the microprocessor 16, having been programmed with the appropriate medication dosage timings, either audibly or viewably generally advises the patient that the next upcoming medication dose is now to be taken. The microprocessor 16 may be further programmed audibly by recording the patients voice information corresponding with the time for taking each medication dose and cubicle lid number so that the patient's own voice will be heard through the speaker advising him or her to take, for example, the bedtime medication on Tuesday contained within the cubicle under lid number 12 as shown in FIG. 4.

The display screen 36 will typically continuously display the day, month, date and year, along with current time. Additionally, preprogrammed information may show, as for example in FIG. 3, that medication doses are to be taken every day by number (sequentially) and that the time to take the next medication dosage is in one hour twenty five minutes under lid number 3 at 10:00 a.m.

Referring now to FIG. 5, an alternate and preferred embodiment of the housing is shown generally at numeral 12a. In this base embodiment 12a, embodying all the features previously described, a signaling arrangement 40 is provided associated with each lid 22a, this embodiment of the lid 22a including a releasable latch 38a but not Braille indicia. Each signaling arrangement 40 includes a light indicator to advise the patient per the preprogramming of the microprocessor 16 as previously described, that the medication dose associated with the activated light associated with that particular cubicle is the one currently to be taken. Moreover, when the correct lid 22a is opened, a make/break switch as shown is activated to provide feedback through conduit 42 having its 28-prong plug connected to the microprocessor 16 at interface jack 30 for transmitting compliance data to be stored concerning when each of the lids 22a has been opened, presuming the medication dose contained therein has been promptly taken by the patient.

Referring now to FIGS. 6 and 7, the preferred embodiment of the self-locking lid latch is there shown at 48. Rather than be manually openable by the patient, the microprocessor 16 activates and withdraws one or both of the interfering dimple locks 48 so that the patient may then open the corresponding lid 22 by lifting at 38.

Figure 11:
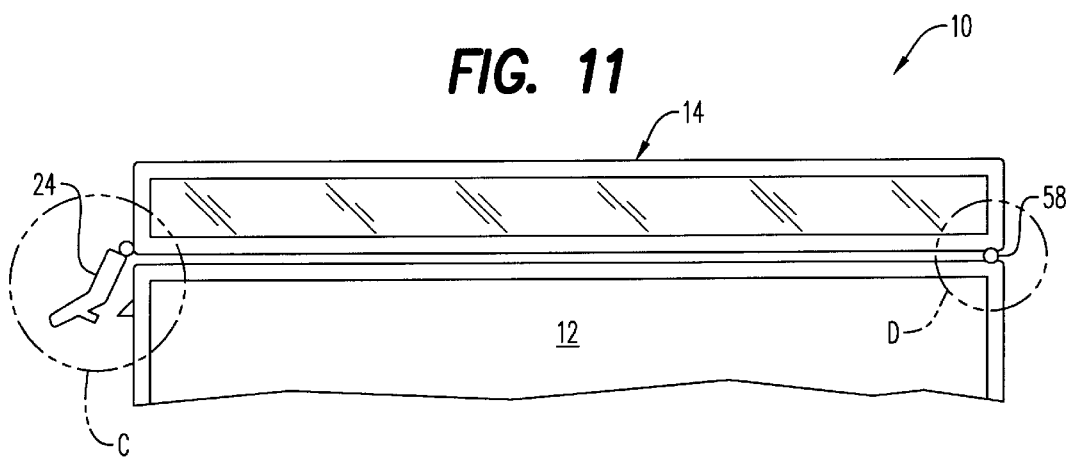
FIG. 11 is a simplified side partial section view of a portion of the housing and cover of the invention.
Figure 12:
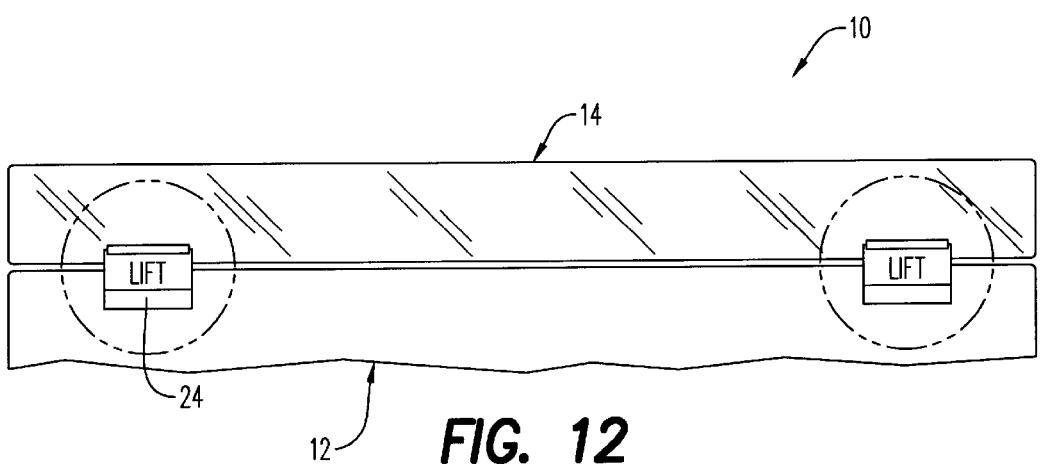
FIG. 12 is a front elevation broken view of FIG. 11.

The cover 14 and housing 12 are shown in simplified form in FIGS. 11 and 12. The cover 14 is transparent double thickness molded member for added strength and pivotally connected to the housing at hinge 58 in area D. The entire housing 12 and lid 14 are preferably molded as a unit, including hinge 58 and the cover locking mechanism 24 within area C.

MICROPROCESSOR FUNCTIONS

The general microprocessor 16 functions are as follows:
1. Initial program input of correct day, month, and time of day.
2. Program input of each day and times for taking each medication along with the number of days, typically seven days. Program the "open time" for each locked lid 22, if this optional locking feature is available.
3. Program input of tone, light and/or voice reminder options.
4. Insert prefilled "egg crate" medicine tray 18 into the housing 12.
5. Upon tone, visual or voice reminder, the optional next-in-time locked lid 22 opens and the corresponding light signal 40 indicates that its time for medication. A green light indicates that each medication is taken "on time", a yellow light indicates "late" and a red light indicates "too late". If "too late", the lid 22 remains locked and medication is unavailable. Where the optional unlocking feature is not present, the next in time cubicle lid is manually opened.
6. Patient takes medication and closes cubicle lid.
7. Microprocessor recorded data of patient compliance is stored and/or transmitted by microprocessor via computer interface to a main computer.

DETAILS OF MICROPROCESSOR FUNCTIONS

The step-by-step programming and use of the microprocessor 16 is as follows:

To set the clock and calendar, first push "on" button and the screen will flash the "day" entry. Push the right arrow (forward button) until the proper "day" appears and then push the enter button. The "day" entry will be fixed on the screen and the "month" entry will flash. Push the right arrow (forward button) until the proper month appears and then push the enter button. Now the day entry and the month entry will be fixed on the screen and the "date" entry will flash on the screen, at which time push the right arrow (forward button) until the proper date appears and then push the enter button. Now the day, month and date will be fixed on the screen and the "year" entry will flash on the screen. Push the right arrow (forward button) until the proper year is shown on the screen and then push the enter button. The day, month, date and year will be fixed on the screen and the "hour" will now flash. Push the forward button until the proper hour is on the screen, then push the enter button. Now the day, month, date, year and hour will be fixed on the screen and the "minute" entry will now flash. Push the right arrow (forward button) until the proper minute entry is shown on the screen, then push the enter button. Now the day, month, date, year, hour and minute will be fixed on the screen and the "am/pm" entry is flashing. Push the up button for "am" or the down button for "pm" and then push the enter button. Now the day, month, date, year, and hour (am or pm) are properly set.

To customize the medicine dosage reminder for the particular patient, push the "on" button and the screen will appear either with prompt or the next dosage setting. Push the "menu" button and the menu options will appear with the timer by day. Push the "enter" button and four time options for each day of the week will appear, the "hour" flashing. Push the right arrow (forward button) until the correct "hour" shows then push the enter button. The hour will be fixed on the screen and the "minute" will be flashing. Push the right arrow (forward button) until the proper minute is indicated, then push enter. Now the hour and minute will be fixed and the "am/pm" will be flashing. Push the up button for "am" or the down button for "pm" and then push the enter button. Now the day, month, date, year, and hour (am or pm) are properly set for the first dosage reminder. The options now shown are "record" which adds new message and erases the old message or "erase" which erases the old message and "enter" which now provides for entry of another dosage reminder for that day. After completing all entries for the day, the screen will indicate the proper day, month, date, year, time of day, the time until the next dose and the time the next dose is due. Continue entering dosages until the timer is set for the upcoming week. The medicine tray may be filled at any time of day or week.

To use the menu option for setting the timer by week, first push the "on" button and the screen will appear with the next dosage setting. Push the "menu" button one time and the menu options appear with highlight now moved down to timer by week. Push the "enter" button and the screen, starting with Sunday blank times or presently set times will show first hour flashing. Push the right arrow (forward button) until the proper hour is indicated. After next pushing the "enter" button, the hour will be fixed and the "minutes" will now flash. Proceed with inputting until the correct day's entries are completed. Day will switch to the same day of the following week until entered time exceeds current time. The day will switch upon completion and pressing "enter". After completing daily entries, the "voice prompt" question will flash on lower screen. Press "record", then "enter" to complete the week. Now the screen indicates that the timer is set for the week and will continue indefinitely.

Another menu option is "timer by number". Push "on" button and the "menu" button twice and the "timer by number" will be highlighted. Push the "enter" button and the screen option "every day the same" or "custom" dates and time. Push the "enter" button and the screen will show date and "every day" hour setting with the "hour" flashing. Push the right arrow (forward button) until the proper hour is indicated then push "enter". Push the right arrow (forward button) until the proper minute is indicated, then push "enter". Now the "am" is highlighted and, if correct, push "enter". Now the "voice prompt?" is offered on the screen and in order to activate the voice prompt, push the "record" button. A voice recording of proper dosage amounts can then be recorded and a warning sound alert can be activated upon pressing "replay". Continue entering all dosages for a given day and press the "enter" button twice. Now the time is set to go off the same every day.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A portable medication storage and reminder device comprising:
   a generally flat housing including a uniform upwardly facing array of medication holding cubides, each said cubide opening upwardly for receiving, holding and removal of a dose of medicaton;
   a plurality of rows of said cubicles sufficient in number for receiving individual periodic daily medication doses over a preselected number of days;

an individually openable lid positioned over and pivotally connected to an upper margin of said cubicle opening and having a separate locking means for releasably retaining each said lid in a closed position to retain each mediation dose within each corresponding said cubicle;

each said lid bearing viewing indicia advising of the proper sequence and timing of manually opening each said lid to gain access to the corresponding dose of medication;

a programmable microprocessor in said housing having a key control panel for receiving and storing input of correct time, day, the preselected number of days, and daily medication times;

said microprocessor also activating a viewable or audible signal connected to said device at each said medication time of each day for the selected number of days;

a transparent protective cover lockably positonable atop said housing and sized for enclosing substantially all of a top of said housing including said cubicles and said key control panel, said cover having a lower surface configured to insure full automatic closing of all said lids and securement of all said locking means when said cover is properly locked in a closed position atop said housing prior to transporting said device.

2. A portable medication storage and reminder device consisting essentially of;

a generally flat housing including a uniform upwardly facing array of medication holding cubicles, each said cubicle opening upwardly for receiving, holding and removal of a dose of medication;

a plurality of rows of said cubicles sufficient in number for receiving individual periodic daily medication doses over a preselected number of days;

an individually openable lid positioned over and pivotally connected to an upper margin of each said cubide opening and having a separate locking means for releasably retaining each said lid in a closed position to retain each medication dose within each corresponding said cubicle;

each said lid bearing viewing indicia advising of the proper sequence and timing of manually opening each said lid to gain access to the corresponding dose of medication;

a programmable microprocessor having a key control panel for receiving and storing input of correct time, day, the preselected number of days, and daily medication times;

said microprocessor also activating a viewable or audible signal connected to said device at each said medication time of each day for the selected number of days;

a transparent protective cover lockably positionable atop said housing and sized for enclosing substantially all of a top of said housing including said cubicles and said key control panel, said cover having a lower surface configured to insure full automatic closing of all said lids and, thereby securing said locking means when said cover is properly locked in a closed position atop said housing prior to carrying said device.

3. A portable medication storage and reminder device comprising:

a generally flat housing including an array of closely, evenly spaced individually openable lids each having a separate locking means for releasably retaining each said lid in a closed position;

a prefilled medication tray separate from and mateably engageable into said housing and having a uniform upwardly facing array of medication holding cubicles, said array of lids aligning and registering with said array of cubicles when said medication tray is mateably engaged into said housing, each cubicle of said array of cubicles opening upwardly for receiving, storing and removal of a dose of medication;

said array of cubicles sufficient in number for holding individual periodic daily medication doses over a preselected number of days and times of each day;

each said lid, when in the closed position, sized to fit into an open upper end of a corresponding said cubicle to insure proper alignment of said medication tray within said housing;

each said lid bearing viewing indicia advising of the proper sequence and timing of manually opening each said lid to gain access to the corresponding dose of medication;

a programmable microprocessor having a key control panel for receiving and storing input of correct time, day, the preselected number of days, and daily medication times;

said microprocessor also activating a viewable or audible signal connected to said device at each said medication time of each day for the selected number of days;

a transparent protective cover lockably positionable atop said housing and sized for enclosing substantially all of a top of said housing including said cubicles and said key control panel, said cover having a lower surface configured to insure full automatic closing of all said lids and securement of all said locking means when said over is properly locked in a closed position atop said housing for subsequent transport of said device.

4. A portable medicaton storage and reminder device as set forth in claim 3, further comprising:

a removable film sheet sealably attached atop said medication tray to seal each said cubicle after all medications have been placed into corresponding said cubicles, said film sheet being removed prior to placing said medication tray into said housing.

5. A portable medicaton storage and reminder device as set forth in claim 3, further comprising:

a means for taking, inputting, and storing compliance data in said microprocessor associated with the opening of each said lid to remove the medication contained within the corresponding said cubicle.

6. A portable medication storage and reminder device as set forth in claim 5, further comprising:

a viewable means associated with each said cubicle for sequentially indicating the pre-programmed next-in-time cubical to be opened.

7. A portable medication storage and reminder device comprising:

a generally flat housing including a uniform upwardly facing array of medication holding cubicles, each said cubicle opening upwardly for receiving, holding and removal of a dose of medication;

a plurality of rows of said cubicles sufficient in number for receiving individual periodic daily medication doses over a preselected number of days;

an individually openable lid positioned over each said cubicle opening and having a separate self-locking lid latch for retaining each said lid in a closed position;

a programmable microprocessor mounted in said housing including a key control panel for receiving and storing input of correct time, day, the preselected number of days, and daily medication times;

said microprocessor also activating a viewable and audible signal connected to said device at each said medication time of each day for the selected number of days;

each said lid bearing viewing indicia advising of the proper sequence and timing of automatic opening of each said lid only by said microprocessor to provide preprogrammed timely access to the corresponding dose of medication;

a transparent protective cover lockably engageable atop said housing and sized for enclosing substantially all of a top of said housing including said cubicles and said key control panel, said cover having a lower surface which engages against and automatically fully doses all said lids and automatic re-engagement of all said locking means when said cover is properly locked in a closed position atop said housing whereby unauthorized access into one or more cubicles and cubicle content spillage or mixing of content between cubicles during handling and transport said device is avoided.

* * * * *

UNITED STATES PATENT AND TRADEMARK OFFICE
CERTIFICATE OF CORRECTION

PATENT NO. : 6,169,707
DATED : Jan. 2, 2001
INVENTOR(S) : Douglas A. Newland

It is certified that error appears in the above-indentified patent and that said Letters Patent is hereby corrected as shown below:

```
Column 3, line 31, rewrite "dosed" as -- closed --.
Column 4, line 13, rewrite "Kg" as -- key --.
Column 7, line 2, following "of", insert -- each --.
Column 8, line 31, rewrite "over" as -- cover --.
Column 10, line 3, rewrite "doses" as -- closes --.
```

Signed and Sealed this

Twenty-ninth Day of May, 2001

Attest:

NICHOLAS P. GODICI

Attesting Officer          Acting Director of the United States Patent and Trademark Office